US011699533B2

(12) United States Patent
Verma et al.

(10) Patent No.: US 11,699,533 B2
(45) Date of Patent: Jul. 11, 2023

(54) ADVANCED LEAD-FREE RADIATION PROTECTION MATERIALS UTILIZING MODIFIED BRINE SLUDGE COMPOSITION AND THE PROCESS THEREOF

(71) Applicant: COUNCIL OF SCIENTIFIC AND INDUSTRIAL RESEARCH AN INDIAN REGISTERED BODY INCORPORATED, New Delhi (IN)

(72) Inventors: Sarika Verma, Madhya Pradesh (IN); Medha Mili, Madhya Pradesh (IN); Mohammed Akram Khan, Madhya Pradesh (IN); Sunil Kumar Sanghi, Madhya Pradesh (IN); Syed Azhar Rasheed Hashmi, Madhya Pradesh (IN); Sanjai Kumar Singh Rathore, Madhya Pradesh (IN); Avanish Kumar Srivastava, Madhya Pradesh (IN)

(73) Assignee: COUNCIL OF SCIENTIFIC AND INDUSTRIAL RESEARCH AN INDIAN REGISTERED BODY INCORPORATED UNDER THE REGN. OF SOC. ACT (ACT XXI OF 1860), New Delhi (IN)

( * ) Notice: Subject to any disclaimer, the term of this patent is extended or adjusted under 35 U.S.C. 154(b) by 0 days.

(21) Appl. No.: 17/451,412

(22) Filed: Oct. 19, 2021

(65) Prior Publication Data

US 2022/0119310 A1 Apr. 21, 2022

(30) Foreign Application Priority Data

Oct. 19, 2020 (IN) .............................. 202011045583

(51) Int. Cl.
| | | |
|---|---|---|
| *G21F 1/04* | (2006.01) | |
| *C04B 14/10* | (2006.01) | |
| *C04B 14/34* | (2006.01) | |
| *C04B 18/04* | (2006.01) | |
| *C04B 22/06* | (2006.01) | |
| *C04B 28/26* | (2006.01) | |
| *B28B 3/02* | (2006.01) | |
| *C04B 111/00* | (2006.01) | |

(52) U.S. Cl.
CPC .............. *G21F 1/042* (2013.01); *C04B 14/10* (2013.01); *C04B 14/34* (2013.01); *C04B 18/0436* (2013.01); *C04B 22/062* (2013.01); *C04B 28/26* (2013.01); *B28B 3/02* (2013.01); *C04B 2111/00862* (2013.01)

(58) Field of Classification Search
CPC . G21F 1/04; G21F 1/042; G21F 1/047; C04B 12/005; C04B 12/04; C04B 14/10; C04B 14/106; C04B 14/136; C04B 18/04; C04B 18/0418; C04B 18/0436; C04B 18/0463; C04B 18/0472; C04B 18/0481; C04B 22/062; C04B 28/26; C04B 2111/00862; B28B 3/02

USPC ................. 252/478; 250/515.1, 517.1, 518.1
See application file for complete search history.

(56) References Cited

U.S. PATENT DOCUMENTS

| | | | | |
|---|---|---|---|---|
| 4,900,360 | A | * | 2/1990 | Whitescarver ...... C04B 18/0418 106/718 |
| 7,731,792 | B2 | * | 6/2010 | Park .................... C04B 18/0445 106/661 |
| 9,890,081 | B2 | * | 2/2018 | Amritphale ......... C04B 18/0418 |
| 10,023,497 | B2 | | 7/2018 | Amritphale et al. |
| 10,165,713 | B2 | * | 12/2018 | Amritphale ............... G21F 1/00 |

FOREIGN PATENT DOCUMENTS

| | | |
|---|---|---|
| CN | 101823738 A | 9/2010 |
| CN | 101823822 A | 9/2010 |
| WO | WO-2020069590 A1 * | 4/2020 |

OTHER PUBLICATIONS

Garg et al. ("Utilization of brine sludge in nonstructural building components: a sustainable approach," Journal of Waste Management, 2014) (Year: 2014).*
Chen et al. ("Utilization of brine sludge in controlled low strength materials (CLSM)", Key Engineering Materials, vol. 801, pp. 436-441, 2019) (Year: 2019).*
Basu, Subrata, et al., "Characteristic Change of Effluent from a Chlor-alkali Industry of India due to Process Modification", International Research Journal of Environment Sciences, vol. 2(2), 44-47, Feb. 2013, (Feb. 2013), 44-47.
Chen, Shin-Jen, et al., "Utilization of Brine Sludge in Controlled Low Strength Materials (CLSM)", Key Engineering Materials, vol. 801, Trans Tech Publications, Ltd., May 2019, pp. 436-441. Crossref, doi:10.4028/www.scientific.net/kem.801.436 [abstract only], (May 2019), 436-441.
Garg, Mridul, et al., "Utilization of Brine Sludge in Nonstructural Building Components: A Sustainable Approach", Journal of Waste Management, vol. 2014, Article ID 389316, 7 pages, (Aug. 21, 2014), 7 pgs.
Hashem, Fayza S., et al., "Utilization of Sludge Resulted from Chlorine Industry in Wastewater Treatment", European Chemical Bulletin 8(4):132, (May 2019), 132-136.

* cited by examiner

Primary Examiner — Matthew R Diaz
(74) Attorney, Agent, or Firm — Schwegman Lundberg & Woessner, P.A.

(57) ABSTRACT

The novel process enables designing of raw materials and processing parameters, enabling synergistic and simultaneous chemical reactions among the various reactants of the design mix of chemical precursor of brine sludge which includes barium sulphate, magnesium hydroxide, calcium carbonate, sodium chloride, silica, aluminum containing compounds necessary for developing highly efficient shielding phases leading to homogenous matrix of shielding materials.

4 Claims, No Drawings

ADVANCED LEAD-FREE RADIATION PROTECTION MATERIALS UTILIZING MODIFIED BRINE SLUDGE COMPOSITION AND THE PROCESS THEREOF

CLAIM OF PRIORITY

This application claims the benefit of priority to Indian Application No. 202011045583, filed 19 Oct. 2020, which application is incorporated by reference as if reproduced herein and made a part hereof in its entirety, and the benefit of priority of which is claimed herein.

FIELD OF THE INVENTION

The present invention relates to an advanced lead-free radiation protection material utilizing modified brine sludge composition. The present invention further relates to a process of preparing the same.

BACKGROUND OF THE INVENTION

All the radiations ranging from a) far infrared b) infra-red c) microwaves d) EMI radiations from mobiles e) x-rays f) gamma radiation and either ionizing or non-ionizing play an important role in humans' life. They are useful in diverse applications. Like x-ray radiations are strongly ionizing due to which they have been intensively used for medical diagnosis and radiotherapy, in x-rays and CT scanner rooms, non-destructive testing and geological exploration, as well as in security zone systems like in airports etc. But these x-rays have been declared as carcinogenic agent by the International Committee on Radiological Protection (ICRP) thus there is an urgent requirement to safely use these x-rays, to avoid its hazardous effects. In this aspect, special type of materials namely radiation protection materials play a paramount performance. Therefore, there is an urgent need to develop advanced radiation protection materials preferably cost effective, which can be obtained by utilizing and processing of waste material as the resource material for the same.

Due to industrialization and urbanization, lot of wastes are generated and the recent stringent rules and regulations for cleaner and greener safe environment, have forced to utilize these industrial wastes for making non-toxic, affordable value-added radiation protection materials, which can be useful in broad application spectrum.

The brine sludge is a waste generated from chloral alkali-industry. The chloral alkali process is the main process for the manufacturing of caustic soda and chlorine production globally. During the production of sodium hydroxide and chlorine in chloral alkali industry by the electrolysis processing of brine solution, which is 30% sodium chloride solution, the brine sludge waste is formed. The brine sludge waste majorly consists of barium sulphate, magnesium hydroxide, calcium carbonate, sodium chloride, clay and other toxic elements like chromium, copper, zinc and vanadium and thus, threatening the posing environment. Production of caustic soda is 76.8 million ton/year Worldwide (2012) and 2.27 million tons/annum in India (2013). India shares 4% of global chlor-alkali production capacity. Global chlor-alkali market projected to reach—$121.6 billion by 2022. Average sludge produced per ton of chlor-alkali produced is around 28.06 kg., thus sludge generation would be 2.15 million ton. Therefore, there is an urgent need to convert toxic brine sludge waste into its non-toxic i.e. lead-free form to develop a novel process enabling developing advanced materials and thereby ensuring complete usage of brine sludge globally.

Thus, the development of advanced lead-free radiation protection materials possessing homogenous radiation protection matrix is of great importance. This can be obtained by developing a novel process by utilizing brine sludge as resource material by its mechano-chemical stimulation along with other materials for developing fine homogeneous powder by modified brine sludge composition. Further the novel process enables in obtaining desired lead-free radiation protection phases by chemically designed and mineralogical formulated compositions during the chemical processing and process parameter by using various complementary precursors present in brine sludge and other raw materials. Basically, brine sludge consists of multi elemental composition which includes barium sulphate, calcium carbonate, magnesium hydroxide, sodium chloride, silica, aluminum containing compounds necessary for developing highly efficient radiation protection phases leading to homogenous matrix of shielding materials. Further the developed novel process is also capable of converting toxic elements like copper. Chromium, zinc and vanadium, present in brine sludge in obtaining additional lead-free radiation protection phases and thus enables converting a toxic waste material in to a highly value-added advanced radiation protection materials possess homogeneous radiation shielding matrix.

In view of the above, a novel process for making advanced lead-free radiation protection materials utilizing modified brine sludge composition has been developed and additionally the process also ensures the complete usage of toxic brine sludge waste along with making highly value-added material with non-toxic, affordable and effective radiation protection properties. The use of developed advanced lead-free radiation protection material utilizing modified brine sludge composition lies in the areas of radiation shielding applications e.g. diagnostic radiation installations such as diagnostic X-ray and CT scanner room.

Mridul Garg and Aakanksha Pundir [*Utilization of Brine Sludge in Nonstructural Building components: A Sustainable Approach, Journal of Waste Management*, vol. 2014, article ID 389316] discloses brine sludge utilized for making low value items like bricks and paver blocks material using conventional cement and fly ash. The drawbacks of the process lies in the fact that a) brine sludge has been for used for making only paver block and brick which are low is value materials: b) that to only minimal utilization i.e. 35% of brine sludge can be achieved and c) thus still the problem of un-utilization of brine sludge of 65% still remains. The toxic elements present in brine sludge have been stabilized in cement matrix and do not form chemical linkages with the toxic elements which do not ensure the long-time un-leach ability of the toxic elements in the environment from bricks and paver blocks made using brine sludge. Since the brine sludge has not been converted into nano-size and in functionalized form, therefore possess limited application in making paver block and brick materials only. The developed process is based on the age-old concept of stabilization of industrial waste into low value-added materials to address the problem of disposal and utilization of waste. The process does not teach the use of any advance synthesis technology and synthesis of highly value-added advance materials to meet the challenges of strict stringent rules and regulations of environmental protection act to address the problem of utilization of industrial toxic waste.

U.S. Pat. No. 10,165,713 provides an Advanced non-toxic radiation shielding materials from tailored brine sludge and a process for the preparation thereof wherein advanced non-toxic radiation shielding materials utilizing tailored brine sludge to make highly value-added advanced radiation shielding materials has been reported. The drawback of the process is the use of common matrix for developing radiation shielding material.

U.S. Pat. No. 10,023,497B2 provides a chemically designed multi-functional advanced materials from geopolymerized brine sludge and a process for the preparation there of wherein fly ash and brine sludge, have been utilized for making chemically designed multifunctional advanced materials (CDMFAM) which are used in various forms and shapes in the areas like industry, transportation, home and recreation. The drawback of the process is the use of long processing parameters.

Subrata. Basu et al [*Characteristic change of effluent from a Chlor-alkali Industry of India due to process modification, International Research Journal of Environment science* vol. 2(2), pp. 44-47, 2013] provides the use of brine sludge for making compost and fertilizer. The drawback lies in the fact that these application does not rule out the possibility of long term leaching out toxic elements from the material made using brine sludge.

CN101823738A provides a "Method for Co-Production of fine is calcium carbonate and sodium silicate in operation of light magnesium carbonate by Chlor-alkali brine sludge. The drawback of the process lie in the fact that the processes involves multi steps and thus making it highly cumbersome and energy intensive and also leads to the increase in pollution load and the brine sludge is also not used in totality.

U.S. Pat. No. 9,890,081B2 provides a functionalized brine sludge material and a process for the preparation thereof, wherein total utilization of brine sludge for mating functionalized brine sludge material useful for a broad application spectrum has been executed. The drawback of the process is obtaining the material via chemical processing and using bulk number of pure chemicals and other raw materials.

CN101823822A provides a method for treating waste brine sludge of soda by hydrochloric acid, wherein hydrochloric acid is used for purifying precipitates of calcium carbonate and calcium sulphate left after the production of light magnesium carbonate. The drawback of the process lie in the fact that the processes involve multi steps and thus making it highly cumbersome and energy intensive and also leads to the increase in pollution load and the brine sludge is also not used in totality.

Fayza S. Hashem, et al. provides the utilization of sludge resulted from chlorine industry in wastewater treatment, wherein successful application of chlorine industry sludge (CLS), which is a solid by-product of chlorine industry plants was used as an effective adsorbent for removal of the heavy metal ions. The drawback of the process is being energy intensive and the brine sludge is not used for making value added materials.

Shin-Jen Chen et al. (2019) provides utilization of brine sludge in controlled low strength materials (CLSM), wherein the brine sludge was used to replace the composition only the fine aggregates or all of the aggregates in CLSM for resource application. The drawback of the process is being energy intensive for developing low strength material.

Further, from hitherto, it is clear that total utilization of brine sludge for making highly effective value-added advanced lead-free radiation protection materials has not been reported by novel approach. Based on the said drawbacks of the known processes, the various issues yet to be addressed and problems to be solved for ensuring total usage of toxic brine sludge for making is highly value-added advanced lead-free radiation protection materials are summarized here as follows:

i. Brine sludge being toxic is creating threat to the environment safety and remained unutilized all over the world.
ii. Crores of rupees can be saved by developing value added materials by a novel process ensuring total usage of toxic brine sludge, otherwise incurred on maintenance of brine sludge ponds all over the world.
iii. Although it contains very useful and expensive precursoric chemical compounds such as barium sulphate, magnesium hydroxide and calcium carbonate and therefore brine sludge can be used as a resource material and can find application in making highly value-added a) cement free materials b) advanced lead-free radiation protection materials and c) advanced chemically designed composite materials by utilizing unique characteristics of chemical compounds genetically present in the brine sludge.
iv. The brine sludge waste has so far limited application and that too in making low value items e.g. Paver block, bricks and controlled low strength materials only.

And the literature reports the use of brine sludge in making fertilizers, effective adsorbent for removal of the heavy metal ions which are associated with the long-term environmental hazards and non-effective benefits.

OBJECTIVE OF THE INVENTION

The main object of the present invention is to provide advanced lead-free radiation protection materials utilizing modified brine sludge composition and the process thereof the use of developed "provide "advanced, lead-free radiation protection materials" utilizing modified brine sludge" composition lies in the areas of radiation shielding applications e.g. diagnostic radiation installations such as diagnostic X-ray and CT scanner room, to other strategic radiation shielding installation which obviates the drawbacks of the hitherto known prior art as detailed above.

Another object of the present invention is to provide a novel process involving mechano-chemical stimulation of heat-treated brine sludge along with other appropriate raw material in desired stoichiometric ration for obtaining fine homogeneous radiation protection powder of modified brine sludge composition for developing homogeneous advanced lead-free radiation protection materials.

Another object of the present invention is to obtain radiation shielding phases by chemical designing and mineralogically formulating compositions based on various precursors of chemicals present in brine sludge along with other appropriate raw material in desired stoichiometric ratio.

Still another object of the present invention is to develop desired mineralogical phases necessary for obtaining uniform and homogenous advanced lead-free radiation protection materials.

Still another object of the present invention is a novel approach of designing of raw materials and processing parameters, enabling synergistic and simultaneous chemical reactions among the various reactants of the design mix of raw materials like brine sludge, tungsten powder, metakaolin, potassium silicate, potassium hydroxide etc.

Yet another object of the present invention is enabling conversion of toxic elements like chromium, zinc, copper and vanadium, present in brine sludge into lead form and leading to development of non-toxic protection phases.

Yet another object of the present invention is to convert a toxic brine sludge waste material in to a highly value-added advanced lead-free radiation protection materials possessing homogeneous radiation shielding matrix.

Yet another object of the present invention is to ensure complete usage of toxic brine sludge.

Yet another object of the present invention is to utilize and save the cost of costly chemicals inherently present in brine sludge otherwise required for making advanced lead-free radiation protection materials.

Yet another object of the present invention is to solve the disposal problem of toxic brine sludge waste and to save the environment all over the world.

SUMMARY OF THE INVENTION

In an aspect of the present invention, there is provided a process for making advanced lead-free radiation protection material utilizing modified brine sludge composition, the process comprising: a) drying of 200 g-800 g of brine sludge in an air oven at 100° C.-110° C. for a period of 1-2 hours, followed by solid state reaction processing and dry grinding along with 20-90 g of tungsten powder and 10 g-60 g metakaolin for a period of 2-4 hours; b) step a followed by adding and grinding 2 g-8 g potassium hydroxide fora period of 1-2 hrs and further adding and grinding 1 g-4 g potassium silicate for a period of 1-2 hrs to obtain fine homogeneous radiation protection powder of modified brine sludge composition; c) step b followed by adding and thoroughly blending with 4 ml-16 ml of water and compacting in a steel mold, using hydraulic pressure in the range of 100-300 kg/cm$^2$ in the form of tiles; and d) step c followed by heating the tiles in a furnace in the temperature range of 900° C.-1100° C. for a period of 1-2 hours to obtain advanced lead-free radiation protection materials.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

DETAILED DESCRIPTION OF THE INVENTION

The invention will now be described in detail in connection with certain preferred and optional embodiments, so that various aspects thereof may be more fully understood and appreciated.

Definitions

For convenience, before further description of the present disclosure, certain terms employed in the specification, and examples are delineated here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature in the range of 100° C. to 110° C. should be interpreted to include not only the explicitly recited limits of 100° C. to 110° C. but also to include sub-ranges, such as 101° C. to 109° C., and so forth, as well as individual amounts, within the specified ranges, such as 100.0° C., 107.3° C. and 110° C.

The present disclosure is not to be limited in scope by the specific embodiments described herein, which are intended for the purposes of exemplification only. Functionally-equivalent products, compositions, and methods are clearly within the scope of the disclosure, as described herein.

The present invention provides an advanced lead-free radiation protection materials utilizing modified brine sludge composition and the process thereof. The process enables designing of raw materials and processing parameters, enabling synergistic and simultaneous chemical reactions among the various reactants of the design mix of chemical precursor of brine sludge which includes barium sulphate, magnesium hydroxide, calcium carbonate, sodium chloride, silica, aluminum containing compounds necessary for developing highly efficient shielding phases leading to homogenous matrix of shielding materials. The present invention involves processes like drying, powdering and mechano-chemical dry grinding of brine sludge with tungsten metal powder, metakaolin, potassium hydroxide, potassium silicate to obtain the modified brine sludge composition and further followed by sintering, for developing homogeneous advanced radiation protection material.

The present invention also provides radiation protection phases by chemical designing and mineralogically formulating compositions based on various precursors of chemicals present in brine sludge along with other chemical precursors. The present invention provides a simultaneous synthesis of desired multi elemental, multi phased, shielding phases lead to the formation of fine homogeneous radiation protection matrix.

Further the developed process also enables conversion of toxic elements like chromium, zinc, copper and vanadium, present in brine sludge in obtaining additional lead-free shielding phases and thus enables converting a toxic waste material in to a highly value-added advanced radiation protection material possess homogeneous radiation shielding matrix. The process involves the modified shielding powder so obtained and is having multi shielding phases and multi crystal phases due to presence of multi elements like Ba, W, Ca, Si, Al, Na, K etc. The process provides desired novel shielding phases by chemical designing and mineralogically formulating compositions based on various precursors of chemicals present in brine sludge along with other chemical precursors. Additionally, the present invention provides desired mineralogical phases necessary for obtaining uniform and homogenous advanced radiation protection materials. The process provides designing of raw materials and processing parameters, enabling synergistic and simultaneous chemical reactions among the various reactants of the design mix of raw materials.

The process enables conversion of toxic elements like chromium, zinc, copper and vanadium, present in brine sludge into non-toxic form and leading to development of lead-free shielding phases. And further convert a toxic brine sludge waste material in to a highly value-added advanced radiation shielding materials possess homogeneous radiation protection matrix. Also, the process provides a complete usage of toxic chloral-alkali industry waste namely brine sludge. The process of the present disclosure utilizes and saves the cost of chemicals inherently present in brine sludge otherwise required for making advanced lead-free radiation protection materials. And further solves the disposal problem of toxic brine sludge waste by utilizing it for the development of advanced material useful in strategic sector and to save the environment all over the world.

To overcome the drawbacks of the hitherto to known processes, the present process simultaneous and synergistic chemical reactions of various mineralogical and chemical compounds which includes barium sulphate, magnesium hydroxide, calcium carbonate, sodium chloride, silica, aluminum containing compounds of brine sludge along with complementary chemical compound namely tungsten powder, metakaolin, potassium hydroxide and potassium silicate to obtain the fine homogeneous powder of modified brine sludge composition for developing homogeneous advanced radiation protection materials. The process involves developing of desired shielding phases possessing uniform and homogenous protection matrix in the developed advanced radiation protection material. Further the process involves designing of raw materials compositions and processing parameters, enabling synergistic and simultaneous chemical reactions among the various reactants of the design mix of raw materials. The modified shielding powder so obtained has multi shielding phases and multi crystal phases due to presence of multi elements like Ba, W, Ca, Si, Al, Na, K etc.

The process provides desired novel shielding phases by chemical designing and mineralogically formulating compositions based on various precursors of chemicals present in brine sludge along with other chemical precursors. The process enables developing of desired mineralogical phases necessary for obtaining uniform and homogenous advanced radiation protection materials. Therefore, the process of the present invention enables for making "advanced lead-free radiation protection materials utilizing modified brine sludge composition and the process thereof" by mechano-chemical activation of heat-treated brine sludge useful for obtaining modified brine sludge composition for developing homogeneous advanced radiation protection materials. Further the use of developed "advanced lead-free radiation protection materials utilizing modified brine sludge composition" lies in the areas of radiation shielding applications e.g. diagnostic radiation installations such as diagnostic X-ray and CT scanner room, to other strategic radiation shielding installation.

Accordingly the present invention provides a process for making advanced lead-free radiation protection material utilizing modified brine sludge composition the process comprising drying of 200 g-800 g of brine sludge in an air oven at 100° C.-110° C. for a period of 1-2 hours, followed by solid state reaction processing via mechano-chemical stimulation of above heat treated brine sludge by dry grinding along with 20-90 g of tungsten powder and 10 g-60 g metakaolin in a mill for a period of 2-4 hours, followed by adding and grinding 2 g-8 g potassium hydroxide for a period of 1-2 hrs and further adding and grinding 1 g-4 g potassium silicate for a period of 1-2 hrs to obtained fine homogeneous radiation protection powder of modified brine sludge composition, followed by adding and thoroughly blending 4 ml-16 ml of water in it and so obtained material was further compacted in a steel mold, using hydraulic pressure in the range of 100-300 kg/cm$^2$ in the form of tiles of dimensions 10 cm×10 cm×6-10 mm and further heated in a furnace in the temperature range of 900° C.-1100° C. for a period of 1-2 hours to make advanced lead-free radiation protection materials.

In an embodiment of the present invention there is provided a process of making advanced lead-free radiation protection material utilizing modified brine sludge composition, the process comprising: a) drying of 200 g-800 g of brine sludge in an air oven at 100° C.-110° C. for a period of 1-2 hours, followed by solid state reaction processing and dry grinding along with 20-90 g of tungsten powder and 10 g-60 g metakaolin for a period of 2-4 hours; b) step a followed by adding and grinding 2 g-8 g potassium hydroxide for a period of 1-2 hrs and further adding and grinding 1 g-4 g potassium silicate for a period of 1-2 hrs to obtain fine homogeneous radiation protection powder of modified brine sludge composition; c) step b followed by adding and thoroughly blending with 4 ml-16 ml of water and compacting in a steel mold, using hydraulic pressure in the range of 100-300 kg/cm$^2$ in the form of tiles; and d) step c followed by heating the tiles in a furnace in the temperature range of 900° C.-1100° C. for a period of 1-2 hours to obtain advanced lead-free radiation protection materials.

In an embodiment of the present invention there is provided a process of making advanced lead-free radiation protection material utilizing modified brine sludge composition as disclosed herein, wherein drying of 200 g-800 g of brine sludge is carried out in an air oven at 100° C.-110° C. for a period of 1-2 hours.

In another embodiment of the present invention there is provided a process of making advanced lead-free radiation protection material utilizing modified brine sludge composition as disclosed herein, wherein the process comprises solid-state reaction processing via mechano-chemical stimulation of heat-treated brine sludge by dry grinding along with 20-90 g of tungsten powder and 10 g-60 g metakaolin in a mill etc. for a period of 2-4 hours.

In yet another embodiment of the present invention there is provided a process of making advanced lead-free radiation protection material utilizing modified brine sludge composition as disclosed herein, wherein adding and grinding of 2 g-8 g potassium hydroxide is carried out for a period of 1-2 hrs to the above powder from step a.

In yet another embodiment of the present invention there is provided a process of making advanced lead-free radiation protection material utilizing modified brine sludge composition as disclosed herein, wherein adding and grinding of 1 g-4 g potassium silicate is carried out for a period of 1-2 hrs to obtain fine homogeneous radiation protection powder of modified brine sludge composition.

In still another embodiment of the present invention there is provided a process of making advanced lead-free radiation protection material utilizing modified brine sludge composition as disclosed herein, wherein the 4 ml-16 ml of water was added and thoroughly blended in so obtained modified brine sludge composition.

In still another embodiment of the present invention there is provided a process of making advanced lead-free radiation protection material utilizing modified brine sludge composition as disclosed herein, wherein the obtained above material was further compacted in a steel mold, using hydraulic pressure in the range of 100-300 kg/cm$^2$ in the form of tiles of dimensions 10 cm×10 cm×6-10 mm.

In still another embodiment of the present invention there is provided a process of making advanced lead-free radiation protection material utilizing modified brine sludge composition as disclosed herein, wherein the compacted material was further heated in a furnace in the temperature range of 900° C.-1100° C. for a period of 1-2 hours to make advanced lead-free radiation protection materials.

In another embodiment of the present invention there is provided a process of making advanced lead-free radiation protection material utilizing modified brine sludge composition as disclosed herein, wherein the process involves simultaneous and synergistic chemical reactions of various mineralogical and chemical compounds which includes barium sulphate, magnesium hydroxide, calcium carbonate, sodium chloride, silica, aluminum containing compounds of brine sludge along with complementary chemical compound namely tungsten powder, metakaolin, potassium hydroxide and potassium silicate to obtain the fine homogeneous powder of modified brine sludge composition.

In yet another embodiment of the present invention there is provided a process of creaking advanced lead-free radiation protection material is utilizing modified brine sludge composition as disclosed herein, wherein the process provides a desired shielding phase possessing uniform and homogenous protection matrix in the developed advanced radiation protection material.

In still another embodiment of the present invention there is provided a process of making advanced lead-free radiation protection material utilizing modified brine sludge composition as disclosed herein, wherein the process provides designing of raw materials compositions and processing parameters, enabling synergistic and simultaneous chemical reactions among the various reactants of the design mix of raw materials. The present invention also provides the modified shielding powder so obtained and is having multi shielding phases and multi crystal phases due to presence of multi elements like Ba, W, Ca, Si, Al, Na, K etc.

In one another embodiment of the present invention there is provided a process of creaking advanced lead-free radiation protection material utilizing modified brine sludge composition as disclosed herein, wherein the modified radiation protection powder so obtained possesses particle ranging from micron to nano size.

In still another embodiment of the present invention there is provided a process of making advanced lead-free radiation protection material utilizing modified brine sludge composition as disclosed herein, wherein the process provides advanced functional radiation shielding materials which are devoid of conventionally used toxic lead, pure barium compound and hematite ore.

In still another embodiment of the present invention there is provided a process of making advanced lead-free radiation protection material utilizing modified brine sludge composition as disclosed herein, wherein the process provides a desired homogeneous shielding matrix by chemically designed and mineralogical formulated compositions using various complementary precursors present in brine sludge and various constituents.

In still another embodiment of the present invention there is provided a process of making advanced lead-free radiation protection material utilizing modified brine sludge composition as disclosed herein, wherein the process provides the process enabling conversion of toxic elements, present in brine sludge, in to non-toxic shielding phases in the developed advanced lead-free radiation is protection materials.

In still another embodiment of the present invention there is provided a process of making advanced lead-free radiation protection material utilizing modified brine sludge composition as disclosed herein, wherein the process provides a simple, energy efficient, environmentally friendly and the cost-effective process enabling wide spread utilization of developed material for broad application spectrum ranging from diagnostic radiation installations such as diagnostic X-ray room to CT scanner room to other strategic radiation shielding installation etc.

EXAMPLES

The following examples are given by way of illustration of the working of the invention in actual practice and therefore should not be construed to limit the scope of the present invention in any way.

Example 1

For making advanced lead-free radiation protection material utilizing modified brine sludge composition, 200 g of brine sludge was dried in an air oven at 100° C. for a period of 1 hour, followed by solid state reaction processing via mechano-chemical stimulation of above heat-treated brine sludge by dry grinding it along with 20 g of tungsten powder and 10 g meta kaolin in a mill for 2 hours. Further, 2 g of potassium hydroxide was added and grinded for 1 hr. Again, 1 g potassium silicate was added and grinded for 1 hr to obtain fine homogeneous radiation protection powder of modified brine sludge composition. Additionally, 4 ml of water was added and thoroughly blended with the above powder. The material so obtained was then compacted in a steel mold, using hydraulic pressure of 100 kg/cm$^2$ in the form of tiles of dimensions 10 cm×10 cm×6 mm. The tiles were then heated in a furnace at 900° C. temperature for 1 hour to obtain advanced lead-free radiation protection materials.

The radiation protection material of thickness value of 6 mm prepared above was evaluated for its X-ray attenuation test with standard filter at respective kV using narrow beam X-ray qualities at 250 kV and the attenuation for kVp i.e. at 90 and 100 kVp were found to be 81 and 78% respectively. The impact strength of the sample was found to be 0.021 kgfm·cm$^{-1}$ and water absorption was found to be 17.0%.

Example 2

For making advanced lead-free radiation protection material utilizing modified brine sludge composition, 300 g of brine sludge was dried in an air oven at 100° C. for a period of 1 hour, followed by solid state reaction processing via mechano-chemical stimulation of above heat-treated brine sludge by dry grinding it along with 30 g of tungsten powder and 25 g meta kaolin in a mill for two and half hours. Further, 3 g of potassium hydroxide was added and grinded for 1 hr. Again, 1.5 g potassium silicate was added and grinded for 1 hr to obtain fine homogeneous radiation protection powder of modified brine sludge composition. Further, 6 ml of water was added and thoroughly blended with the above powder. The material obtained was then compacted in a steel mold, using hydraulic pressure of 200 kg/cm$^2$ in the form of tiles of dimensions 10 cm×10 cm×7 mm. The tiles were then heated in a furnace at 950° C. temperature for 1.5 hours to obtain advanced lead-free radiation protection materials.

The radiation protection material of thickness value of 7 mm prepared above was evaluated for its X-ray attenuation test with standard filter at respective kV using narrow beam X-ray qualities at 250 kV and the attenuation for kVp i.e. at 90 and 100 kVp were found to be 83 and 80% respectively. The impact strength of the sample was found to be 0.023 kgfm·cm$^{-1}$ and water absorption was found to be 14.0%.

Example 3

For making advanced lead-free radiation protection material utilizing modified brine sludge composition, 400 g of brine sludge was dried in an air oven at 100° C. for a period of one and half hour, followed by solid state reaction processing via mechano-chemical stimulation of above heat-treated brine sludge by dry grinding it along with 40 g of tungsten powder and 45 g meta kaolin in a mill for 3 and half hours. Further, 4 g of potassium hydroxide was added and grinded for one and half hr. Again. 2 g potassium silicate was added and grinded for one and half hr. to obtain fine homogeneous radiation protection powder of modified brine sludge composition. Further, 8 ml of water was added and thoroughly blended with the above powder. The material obtained was then compacted in a steel mold, using hydraulic pressure of 250 kg/cm$^2$ in the form of tiles of dimensions 10 cm×10 cm×8 mm. The tiles were then heated in a furnace at 1000° C. temperature for 1.5 hours to obtain advanced lead-free radiation protection materials.

The radiation protection material of thickness value of 8 mm prepared above was evaluated for its X-ray attenuation test with standard filter at respective kV using narrow beam X-ray qualities at 250 kV and the attenuation for kVp i.e. at 90 and 100 kVp were found to be 86 and 84% respectively. The impact strength of the sample was found to be 0.025 kgfm·cm$^{-1}$ and water absorption was found to be 12.0%.

Example 4

For making advanced lead-free radiation protection material utilizing modified brine sludge composition, 650 g of brine sludge was dried in an air oven at 110° C. for a period of 2 hours, followed by solid state reaction processing via mechano-chemical stimulation of above heat-treated brine sludge by dry grinding it along with 60 g of tungsten powder and 50 g meta kaolin in a mill for three and half hours. Further, 5 g of potassium hydroxide was added and grinded for two and half hrs. Again, 2 g potassium silicate was added and grinded for 2 hr. to obtain fine homogeneous radiation protection powder of modified brine sludge composition. Further, 10 ml of water was added and thoroughly blended with the above powder. The material so obtained was further compacted in a steel mold, using hydraulic pressure of 275 kg/cm$^2$ in the form of tiles of dimensions 10 cm×10 cm×9 mm. The tiles were then heated in a furnace at 1000° C. temperature for 1 hour to obtain advanced lead-free radiation protection materials.

The radiation protection material of thickness value of 9 mm prepared above was evaluated for its X-ray attenuation test with standard filter at respective kV using narrow beam X-ray qualities at 250 kV and the attenuation for kVp i.e. at 90 and 100 kVp were found to be 88 and 86% respectively. The impact strength of the sample was found to be 0.030 kgfm·cm$^{-1}$ and water absorption was found to be 10.0%.

Example 5

For making advanced lead-free radiation protection material utilizing modified brine sludge composition, 800 g of brine sludge was dried in an air oven at 110° C. for a period of 2 hours, followed by solid state reaction processing via mechano-chemical stimulation of above heat-treated brine sludge by dry grinding it along with 90 g of tungsten powder and 60 g meta kaolin in a mill for 4 hours. Further, 8 g of potassium hydroxide was added and grinded for 2 hr. Again. 4 g potassium silicate was added and grinded for 2 hr to obtain fine is homogeneous radiation protection powder of modified brine sludge composition. Further, 16 ml of water was added and thoroughly blended with the above powder. The material obtained was then compacted in a steel mold, using hydraulic pressure of 300 kg/cm$^2$ in the form of tiles of dimensions 10 cm×10 cm×10 mm. The tiles were then heated in a furnace at 1100° C. temperature for 1 hour to obtain advanced lead-free radiation protection materials.

The radiation protection material of thickness value of 9 mm prepared above was evaluated for its X-ray attenuation test with standard filter at respective kV using narrow beam X-ray qualities at 250 kV and the attenuation for kVp i.e. at 90 and 100 kVp were found to be 90 and 88% respectively. The impact strength of the sample was found to be 0.032 kgfm·cm$^{-1}$ and water absorption was found to be 8.0%.

Advantages of the Present Invention

The process of the present invention involves drying, powdering and grinding for mechano-chemical activation of heat-treated brine sludge for obtaining fine homogeneous powder for developing homogeneous advanced radiation protection materials.

The process of the present invention provides radiation protection phases by chemical designing and mineralogically formulating compositions based on various precursors of chemicals present in brine sludge along with other raw materials.

The process of the present invention provides a desired mineralogical phase necessary for obtaining uniform and homogenous advanced radiation protection materials.

The process involves designing of raw materials and processing parameters, enabling synergistic and simultaneous chemical reactions among the various reactants of the design mix of raw materials.

The process provides a conversion of toxic elements like chromium, zinc, copper and vanadium, present in brine sludge into non-toxic form and leading to development of non-toxic shielding phases.

Other advantage of the process of the present invention is conversion of a toxic brine sludge waste material in to a highly value added advanced non-toxic radiation shielding materials possessing homogeneous is radiation shielding matrix. And the process ensures complete utilization of toxic brine sludge.

The process utilizes and avoids use of costly chemicals which are inherently present in the brine sludge otherwise required for making advanced lead-free radiation protection materials.

The process solves the disposal problem of toxic brine sludge waste and saves the environment.

The process is economically fruitful by providing value added advanced non-toxic radiation protection materials and ensuring total utilization of toxic brine sludge, otherwise incurred on maintenance of brine sludge ponds globally.

We claim:

1. A process for making an advanced lead-free radiation protection material utilizing modified brine sludge composition, the process comprising:
   a. drying of 200 g-800 g of brine sludge in an air oven at 100° C.-110° C. for a period of 1-2 hours to produce a heat-treated brine sludge, followed by simultaneous solid state reaction processing and dry grinding with 20-90 g of tungsten powder and 10 g-60 g metakaolin for a period of 2-4 hours;
   b. after step a, adding and grinding 2 g-8 g potassium hydroxide for a period of 1-2 hrs and further adding and grinding 1 g-4 g potassium silicate for a period of 1-2 hrs to obtain fine homogeneous radiation protection powder of modified brine sludge composition;
   c. after step b, adding and thoroughly blending with 4 ml-16 ml of water and compacting in a steel mold by providing hydraulic pressure in the range of 100-300 $kg/cm^2$ to obtain tiles; and
   d. after step c, heating the tiles in a furnace in the temperature range of 900° C.-1100° C. for a period of 1-2 hours to obtain the advanced lead-free radiation protection material.

2. The process as claimed in claim 1, wherein in step a drying of 200 g-800 g of brine sludge is carried out in an air oven at 100° C. for a period of 1-2 hours.

3. The process as claimed in claim 1, wherein the solid state reaction processing is carried out by mechano-chemical stimulation of the heat-treated brine sludge.

4. The process as claimed in claim 1, wherein compacting is carried out in a steel mold by providing hydraulic pressure in the range of 100-300 $kg/cm^2$ to obtain tiles of dimensions 10 cm×10 cm×6-10 mm.

* * * * *